(12) United States Patent
Noda

(10) Patent No.: US 10,048,908 B2
(45) Date of Patent: Aug. 14, 2018

(54) IMAGE FORMING APPARATUS, IMAGE FORMING SYSTEM AND METHOD FOR RETRIEVING SHEET PROFILE

(71) Applicant: Konica Minolta, Inc., Chiyoda-ku, Tokyo (JP)

(72) Inventor: Yoriko Noda, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/338,541

(22) Filed: Oct. 31, 2016

(65) Prior Publication Data

US 2017/0131955 A1    May 11, 2017

(30) Foreign Application Priority Data

Nov. 11, 2015 (JP) ................. 2015-221170

(51) Int. Cl.
    *G06F 3/12*       (2006.01)
    *H04N 1/00*      (2006.01)
    *G06K 15/00*    (2006.01)

(52) U.S. Cl.
     CPC .......... *G06F 3/1231* (2013.01); *G06F 3/1204* (2013.01); *G06F 3/1257* (2013.01);
     (Continued)

(58) Field of Classification Search
     CPC .... G06F 3/1204; G06F 3/1205; G06F 3/1208; G06F 3/1257; G06F 3/1231;
     (Continued)

(56) References Cited

U.S. PATENT DOCUMENTS

| 5,370,466 A | 12/1994 | Kimura |
| 2005/0063016 A1* | 3/2005 | Takahashi ............ H04N 1/6091 358/3.24 |

(Continued)

FOREIGN PATENT DOCUMENTS

| JP | H05-185664 A | 7/1993 |
| JP | 2007-243313 A | 9/2007 |

(Continued)

OTHER PUBLICATIONS

Office Action (Notice of Reasons for Rejection) dated Oct. 3, 2017, by the Japanese Patent Office in corresponding Japanese Patent Application No. 2015-221170, and an English Translation of the Office Action. (10 pages).

(Continued)

*Primary Examiner* — Gabriel Garcia
(74) *Attorney, Agent, or Firm* — Buchanan Ingersoll & Rooney PC

(57) ABSTRACT

An image forming apparatus includes: a storage section configured to store a sheet profile in coordination with environment information of at least one of a temperature and a humidity around the apparatus, the sheet profile including an image formation condition in accordance with a sheet; an acquisition section configured to acquire the environment information; and a retrieval section configured to retrieve a sheet profile corresponding to current environment information acquired by the acquisition section from among the sheet profile stored in the storage section.

14 Claims, 9 Drawing Sheets

(52) U.S. Cl.
CPC ......... *G06F 3/1285* (2013.01); *H04N 1/0048* (2013.01); *H04N 1/0049* (2013.01); *H04N 1/00411* (2013.01); *H04N 1/00424* (2013.01); *H04N 1/00472* (2013.01); *H04N 1/00976* (2013.01)

(58) Field of Classification Search
CPC .... G06F 3/1254; G06F 3/1285; G06F 3/1288; G06F 3/1292; H04N 1/0048; H04N 1/00472; H04N 1/00424; H04N 1/00962; H04N 1/00973; H04N 1/00976; H04N 1/0049; H04N 1/00411; H04N 2201/0094
USPC .................................................. 358/1.1–1.18
See application file for complete search history.

(56) References Cited

U.S. PATENT DOCUMENTS

| | | | |
|---|---|---|---|
| 2006/0280537 A1* | 12/2006 | Matsushima | H04N 1/40006 400/62 |
| 2011/0043837 A1* | 2/2011 | Kanamori | G03G 15/502 358/1.9 |
| 2014/0140710 A1* | 5/2014 | Yoshimura | G03G 15/6511 399/9 |
| 2015/0055172 A1 | 2/2015 | Iida | |
| 2015/0242172 A1* | 8/2015 | Murphy | G06F 3/1205 358/1.6 |

FOREIGN PATENT DOCUMENTS

| | | | |
|---|---|---|---|
| JP | 2009-176126 A | | 8/2009 |
| JP | 2013-125786 A | | 6/2013 |
| JP | 2015-001607 | * | 1/2015 |
| JP | 2015-001607 A | | 1/2015 |
| JP | 2015-32139 A | | 2/2015 |
| JP | 2015-041873 A | | 3/2015 |

OTHER PUBLICATIONS

Notice of Reasons for Rejection dated Jan. 30, 2018, by the Japan Patent Office in Japanese Patent Application No. 2015-221170 and English translation of the Office Action (7 pages).

* cited by examiner

IMAGE FORMING APPARATUS, IMAGE FORMING SYSTEM AND METHOD FOR RETRIEVING SHEET PROFILE

CROSS REFERENCE TO RELATED APPLICATIONS

This application is entitled to and claims the benefit of Japanese Patent Application No. 2015-221170, filed on Nov. 11, 2015, the disclosure of which including the specification, drawings and abstract is incorporated herein by reference in its entirety.

BACKGROUND OF THE INVENTION

1. Field of the Invention

The present invention relates to an image forming apparatus, an image forming system and a method for retrieving a sheet profile.

2. Description of Related Art

Conventionally, in image forming apparatuses that perform electrophotographic image formation, a developing device for developing an electrostatic latent image formed on a photoconductor drum serving as an image bearing member is provided. The developing device contains toner, and applies the toner from the developing sleeve toward the photoconductor drum at the time of development to visualize an electrostatic latent image on the photoconductor drum as a toner image.

The charging amount of the toner in the developing device changes depending on the environment (such as temperature and humidity). For example, the charging amount of toner particles tends to decrease when the humidity around the device is high. When the charging amount of toner particles is changed, the density and the quality of the output image are also changed in accordance with the change of the charging amount of toner particles.

Therefore, it has been proposed to perform image formation such that sheet profiles are registered in advance in coordination with environment information such as temperature and humidity, and the user selects the sheet profile corresponding to the current environment information from among the registered sheet profiles, and, the image formation condition (for example, the charging potential of the photoconductor drum) of the selected sheet profile is used for the image formation.

For example, Japanese patent application No. 2013-125786 discloses a technique in which a plurality of setting values in accordance with the environment (such as high temperature and low temperature) are assigned to an item (for example, transfer potential) of one sheet profile, and thus the setting value can be automatically switched even when the environment is changed as long as the setting value according to the changed environment is assigned.

However, with the technique disclosed in Japanese patent application No. 2013-125786, a sheet profile assigned with the setting value in accordance with the environment, and a sheet profile which is not assigned with the setting value may possibly registered. These sheet profiles only differ in assignment of the setting value, and therefore are similar to each other. The number of such similar sheet profiles tends to increase in accordance with the use period, the use frequency, the number of users and the like.

Accordingly, when selecting the sheet profiles, the user has to take care of not mistakenly select a similar sheet profile. As such, the task of selecting the sheet profiles has been complicated.

SUMMARY OF THE INVENTION

To solve the above-mentioned problems, an object of the present invention is to provide an image forming apparatus, an image forming system and a method for retrieving a sheet profile which can reduce the task of selecting the sheet profiles.

To achieve the abovementioned object, an image forming apparatus reflecting one aspect of the present invention includes: a storage section configured to store a sheet profile in coordination with environment information of at least one of a temperature and a humidity around the apparatus, the sheet profile including an image formation condition in accordance with a sheet; an acquisition section configured to acquire the environment information; and a retrieval section configured to retrieve a sheet profile corresponding to current environment information acquired by the acquisition section from among the sheet profile stored in the storage section.

To achieve the abovementioned object, an image forming system composed of a plurality of units including an image forming apparatus reflecting one aspect of the present invention includes: a storage section configured to store a sheet profile in coordination with environment information of at least one of a temperature and a humidity around the apparatus, the sheet profile including an image formation condition in accordance with a sheet; an acquisition section configured to acquire the environment information; and a retrieval section configured to retrieve a sheet profile corresponding to current environment information acquired by the acquisition section from among the sheet profile stored in the storage section.

To achieve the abovementioned object, a method for retrieving a sheet profile reflecting one aspect of the present invention includes: storing a sheet profile in coordination with environment information of at least one of a temperature and a humidity around an apparatus, the sheet profile including an image formation condition in accordance with a sheet; acquiring the environment information; and retrieving a sheet profile corresponding to the acquired current environment information from the stored sheet profile.

DESCRIPTION OF THE PREFERRED EMBODIMENT

In the following, an image forming apparatus, an image forming system and a method for retrieving a sheet profile of an embodiment of the present invention are described with reference to the accompanying drawings.

Figure 1:
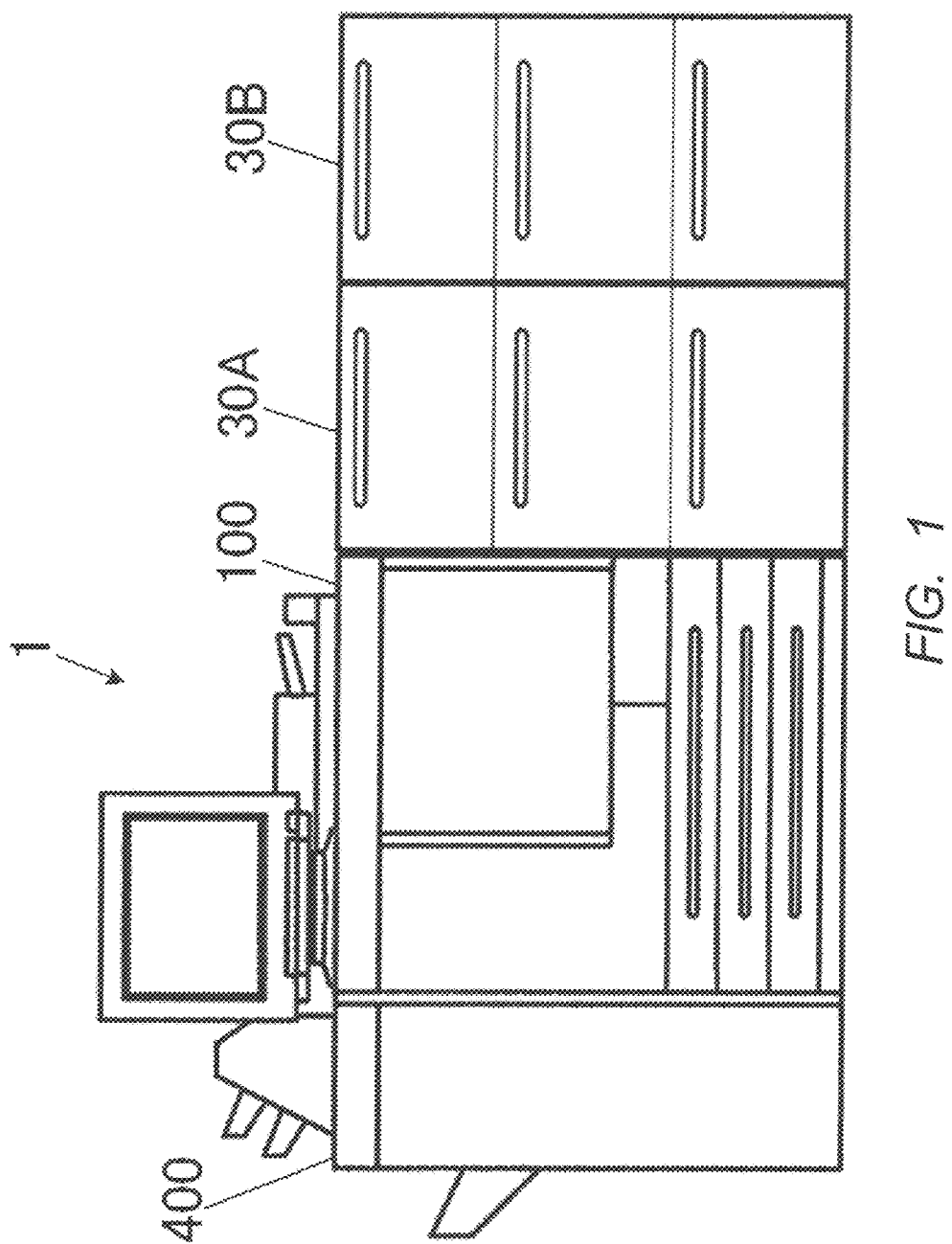
FIG. 1 illustrates an external appearance of a configuration of an image forming system according to an embodiment of the present invention.
Figure 2:
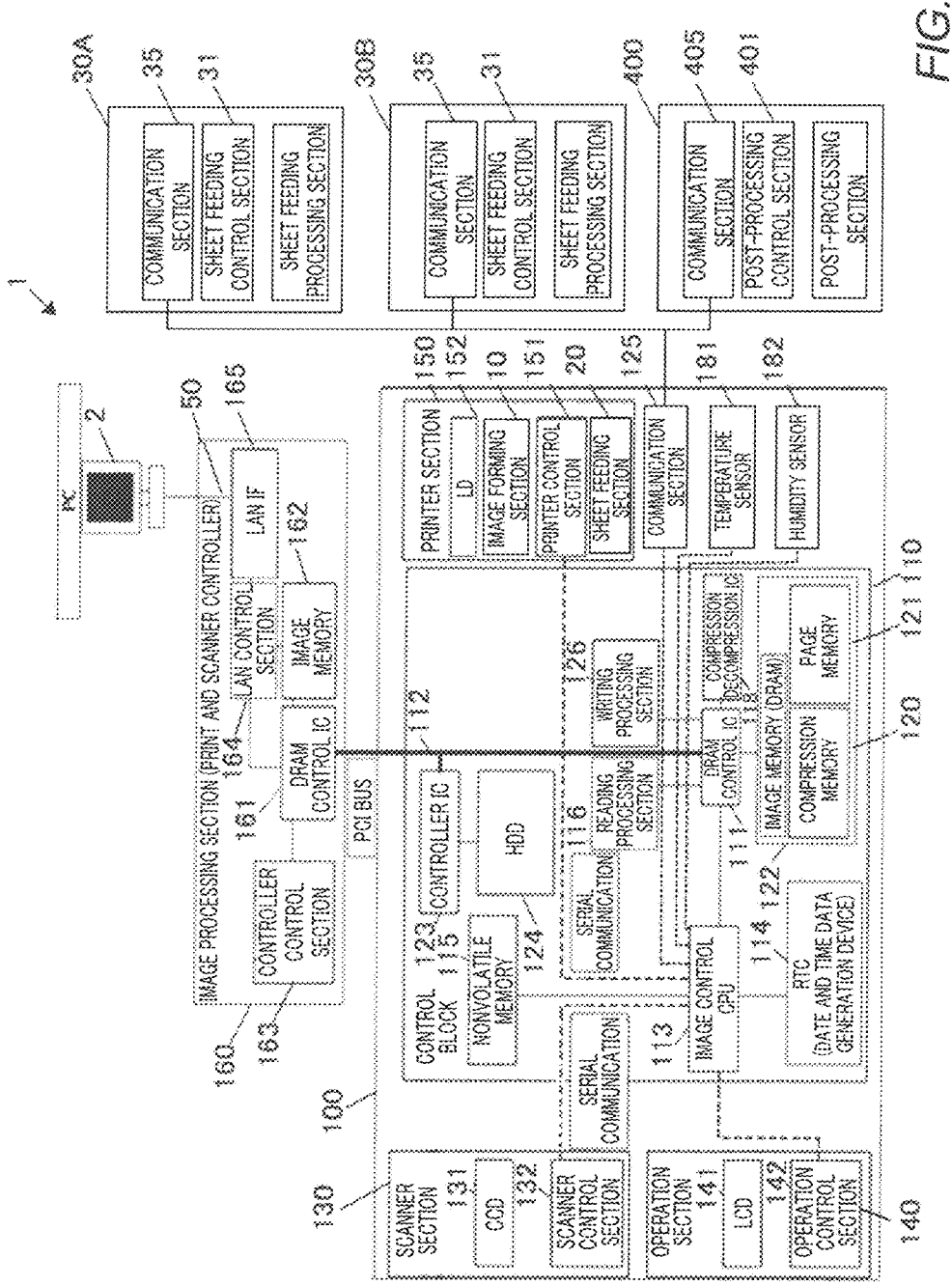
FIG. 2 is a block diagram illustrating a configuration of an image forming system according to the embodiment of the present invention.

FIG. 1 illustrates an external appearance of a configuration of the image forming system of the embodiment, and FIG. 2 is a block diagram illustrating an electrical configuration of the image forming system of the embodiment. While the image forming system 1 illustrated in FIG. 1 and FIG. 2 are connected with a plurality of apparatuses, the number of the connected apparatuses and the kind of the connected apparatuses are not limited to this example.

As illustrated in FIG. 1, in image forming system 1, tray unit 30A or 30B, image forming apparatus 100, and after-treatment apparatus 400 which performs various kinds of processes (a punching process, a stapling process, a glue bookbinding process and the like) on a sheet on which an image is formed are connected together in series in a direction of sheet flow from right to left in FIG. 1. It is to be noted that the term "sheet" used herein includes printing media such as paper and a plastic sheet.

In addition, as illustrated in FIG. 1 and FIG. 2, control sections (sheet feeding control section 31, a main control section (image control CPU 113), and post-processing control section 401) of tray units 30A and 30B, image forming apparatus 100, and after-treatment apparatus 400 communicate with each other through communication sections 35, 125 and 405 and thus tray units 30A and 30B, image forming apparatus 100, and after-treatment apparatus 400 perform coordinated control operations. In addition, image forming system 1 may operate with an information processing device such as terminal equipment 2, and such an information processing device may be used as a part of the image forming system.

As illustrated in FIG. 2, image forming system 1 includes, as the main configuration, image forming apparatus 100 and image processing section (print and scanner controller) 160. Image forming apparatus 100 includes control block 110, scanner section 130, operation section 140, and printer section 150 (which corresponds to the "image forming section" of the embodiment of the invention). Image processing section 160 is configured to process image data which is exchanged through LAN 50 with terminal equipment 2.

Control block 110 includes PCI bus 112, and PCI bus 112 is connected with DRAM control IC 111 in control block 110. In addition, control block 110 includes image control CPU 113, and image control CPU 113 is connected with DRAM control IC 111. In addition, image control CPU 113 is connected with nonvolatile memory 115 (which corresponds to the "storage section" of the embodiment of the invention).

Image control CPU 113 controls the entirety of image forming apparatus 100, and monitors the state of the entire image forming apparatus 100.

Nonvolatile memory 115 stores programs for operating image control CPU 113 and sheet profiles for sheets used in image forming apparatus 100. Here, the sheet profile is data collectively containing items of the property including the type of the sheet and the image formation condition such as sheet type, basis weight, sheet color, multiplying factor difference between front and rear, charging potential, transfer potential, fixation pressing force, glue temperature, and folding pressure.

Image forming apparatus 100 is provided with temperature sensor 181 configured to detect the inner temperature of the apparatus (which corresponds to the "environment information" of the embodiment of the invention) and humidity sensor 182 configured to detect the inner humidity of the apparatus (which corresponds to the "environment information" of the embodiment of the invention). Image control CPU 113 (which corresponds to the "acquisition section" of the embodiment of the invention) acquires temperature information from temperature sensor 181, and acquires humidity information from humidity sensor 182. As described later, image control CPU 113 acquires environment information (temperature and humidity) at the time when image control CPU 113 receives a registration request of a sheet profile based on an input on operation section 140, and every time when a predetermined period has elapsed during a job (periodical operation).

Operation section 140 includes touch-screen LCD 141 and operation control section 142 which are connected to each other. Operation control section 142 and image control CPU 113 are communicatively connected with each other. With this configuration, operation section 140 is controlled by image control CPU 113. It is to be noted that operation control section 142 may be composed of a CPU, a program for operating the CPU and the like. Operation section 140 can receive an input of an operation control condition such as an operation request and setting of image forming apparatus 100, and further, can indicate the details of the setting, the state of the machine, information and the like. Operation section 140 is controlled by image control CPU 113.

For example, when a sheet profile is registered in coordination with environment information acquired at the start of a job and an image formation is performed based on the image formation condition of the sheet profile, in addition, when the current environment information acquired during a job is changed from the environment information acquired at the start of a job, a sheet profile corresponding to the current environment information is required to be registered. However, in the present embodiment, the sheet profile is not always registered every time when the environment information is changed. Here, the term "current" means the time at which a job is being executed (a time point between the start of a job to the end of the job), and in this example, at a time point when image control CPU 113 receives a registration request of a sheet profile.

For example, even when the current environment information is changed from the environment information of the start of the job, the density and the quality of the output image may not be changed in an image formation based on the image formation condition of the sheet profile corresponding to the environment information of the start of the job in the case where the effective range of the environment information at the start of the job includes the current environment information, or in other words, in the case where the effective range of the environment information of the start of the job is identical to the effective range of the current environment information. In the above-mentioned case, the sheet profile corresponding to the current environment information is not required to be newly registered. The term "effective range" used herein refers to a range in which the sheet profile coordinated with the range is effective for any of the environment information in the range.

In the present embodiment, when receiving a registration request of a sheet profile, image control CPU 113 acquires temperature information from temperature sensor 181, and acquires humidity information from humidity sensor 182. With reference to the table, image control CPU 113 (which corresponds to the "control section" of the embodiment of the invention) stores the effective range of the acquired current environment information in association with the sheet profile in nonvolatile memory 115. Here, the effective range and the sheet profile are associated with each other in the table, and the effective range in the table can be uniquely determined based on the effective range of the environment information. That is, the effective range of the environment information and the effective range in the table are identical to each other, or, the effective range of the environment information is included in the effective range in the table.

In the following description, storing of the environment information, storing of the effective range, and storing of the sheet profile into nonvolatile memory 115 are also referred to as "registration of environment information," "registration of effective range," and "registration of sheet profile," respectively. In addition, the environment information, the effective range and the sheet profile stored in nonvolatile memory 115 are also referred to as "registered environment information," "registered effective range" and "registered sheet profile," respectively.

In addition, image control CPU 113 may determine the sheet profile by referring to a calculation formula based on the effective range of the current environment information without referring to the table so as to register the determined sheet profile, for example.

Figure 3:
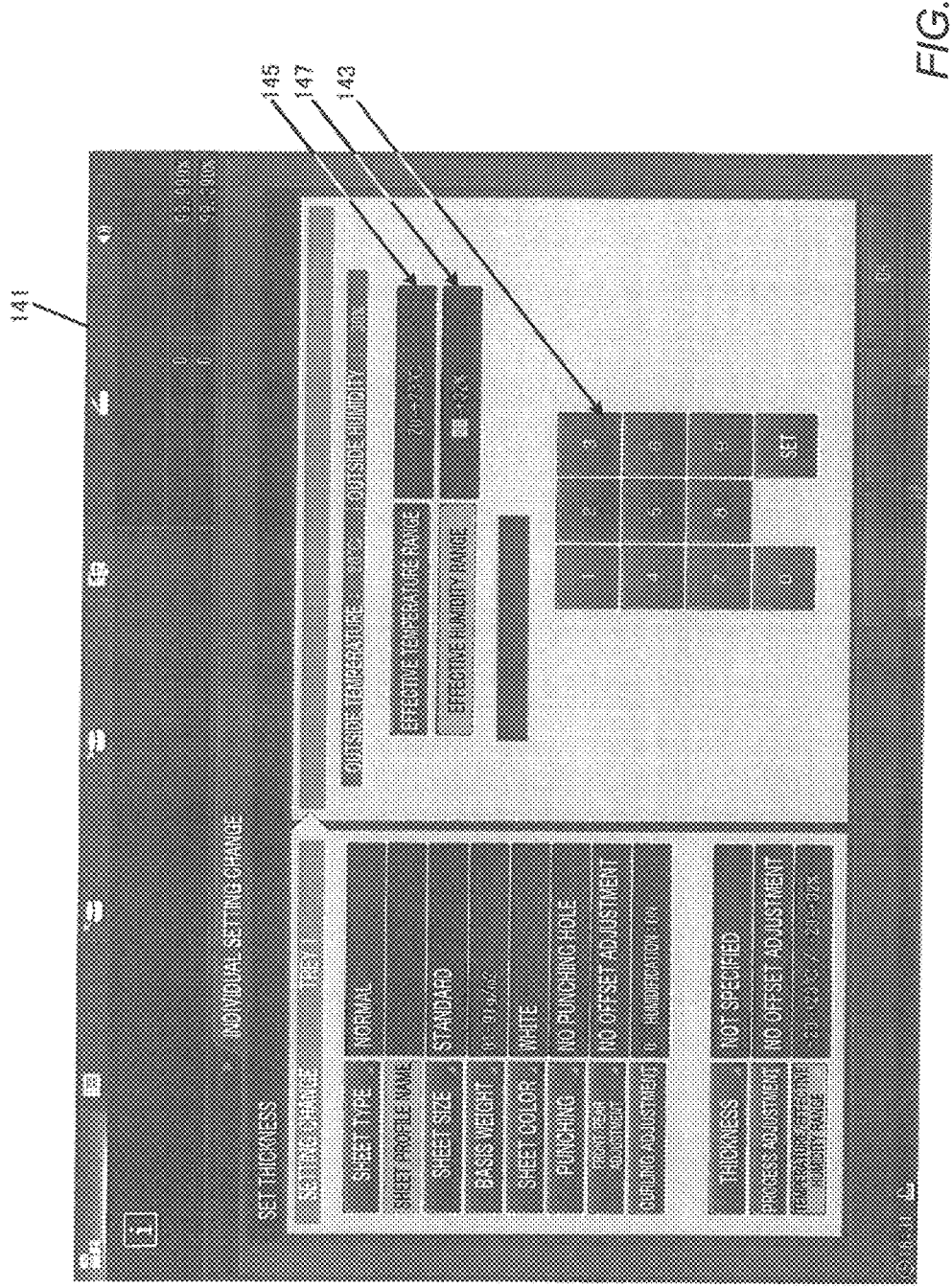
FIG. 3 is an input screen of the effective range.

FIG. 3 illustrates an input screen of the effective range. FIG. 3 illustrates input key 143, text box 145 of the effective temperature range, and text box 147 of the effective humidity range. Image control CPU 113 stores +20 to +23° C. input in text box 145 from operation section 140 into nonvolatile memory 115 as the effective temperature range, and stores +28 to +32% input in text box 147 into in nonvolatile memory 115 as the effective humidity range, for example. It is to be noted that the term "effective range" includes both the effective temperature range and the effective humidity range.

When receiving an input request of the effective range from operation section 140, image control CPU 113 controls LCD 141 to indicate an input screen of the effective range.

Image control CPU 113 stores the sheet profile in nonvolatile memory 115 in association with the effective range (+20 to +23° C., +28 to +32%) of the acquired current environment information (for example, temperature 22° C., humidity 30%). In the present embodiment, "correspondence" of the environment information and the sheet profile means that the environment information and the sheet profile directly or indirectly correspond to each other. In addition, "association" means "indirect correspondence."

That is, in the present embodiment, image control CPU 113 stores the effective range of the acquired current environment information in indirect coordination with the sheet profile in nonvolatile memory 115. In this manner, image control CPU 113 can retrieve the sheet profile indirectly corresponding to the effective range of the acquired current environment information from among the sheet profiles stored in nonvolatile memory 115.

It is to be noted that image control CPU 113 may store the acquired current environment information in nonvolatile memory 115 in direct coordination with the sheet profile. In this manner, image control CPU 113 can retrieve the sheet profile directly corresponding to the acquired current environment information from among the sheet profiles stored in nonvolatile memory 115.

Further, in the case where the effective range of the current environment information is already stored in association with the sheet profile in nonvolatile memory 115, image control CPU 113 does not perform the registration of the sheet profile. On the other hand, in the case where the effective range of the current environment information is not stored in association with the sheet profile in nonvolatile memory 115, image control CPU 113 performs the registration of the sheet profile.

For example, image control CPU 113 periodically (for example, at the interval of 1 minutes) acquires the current environment information from temperature sensor 181 and the like during a job, and determines whether the effective range of the acquired current environment information and the effective range of the retrieved sheet profile correspond to each other. When it is determined that the effective ranges do not correspond to each other, image control CPU 113 controls LCD 141 to indicate a warning sign. On the other hand, it is determined that the effective ranges correspond to each other, image control CPU 113 does not operate to indicate a warning sign even when the current environment information and the retrieved the environment information of the sheet profile do not correspond to each other.

At the start of a job, or at the time when a request of retrieving the sheet profile by an input on operation section 140 is received after indicating a warning sign, image control CPU 113 acquires environment information from temperature sensor 181 and the like. Further, image control CPU 113 (which corresponds to the "retrieval section" of the embodiment of the invention) retrieves, from among the registered sheet profiles, the sheet profile associated with the effective range of the acquired environment information as the sheet profile coordinated with the acquired environment information.

Figure 4:
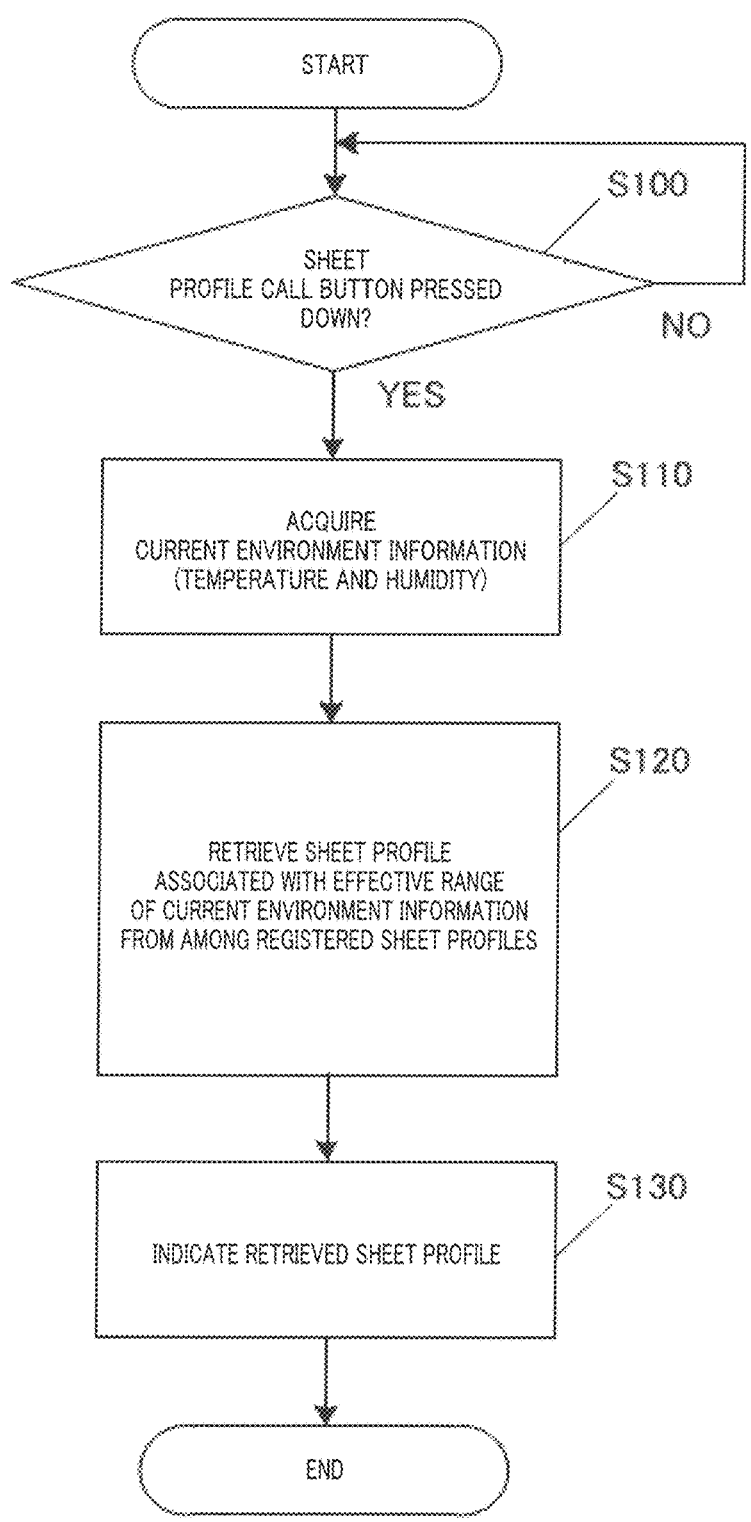
FIG. 4 is a flowchart of an operation of retrieving a sheet profile according to the embodiment of the present invention.

Next, a retrieve operation of the sheet profile is described with reference to FIG. 4. FIG. 4 is a flowchart of a retrieve operation of the sheet profile. The processing of this flowchart is started after the start of a job. It is to be noted that the following description will be made on the assumption that registration of the sheet profile and association of the effective range have been performed prior to the processing of this flowchart.

At step S100, image control CPU 113 determines whether a sheet profile call button (hereinafter referred to simply as "call button") is pressed down on operation section 140. When it is determined that the call button is pressed down (step S100: YES), the process is advanced to step S110. When it is determined that the call button is not pressed down (step S100: NO), image control CPU 113 again determines whether the call button is pressed down (step S100).

At step S110, image control CPU 113 acquires the current environment information (temperature and humidity). Here, the term "current" is the time when the sheet profile call button is pressed on operation section 140.

At step S120, from among the registered sheet profiles (the sheet profiles stored in nonvolatile memory 115), image control CPU 113 retrieves the sheet profile associated with the effective range of the current environment information (retrieval of the sheet profile).

At step S130, image control CPU 113 controls LCD 141 to indicate the retrieved sheet profile. Image control CPU 113 performs an image formation control based on the image formation condition of the retrieved sheet profile.

Figure 5:
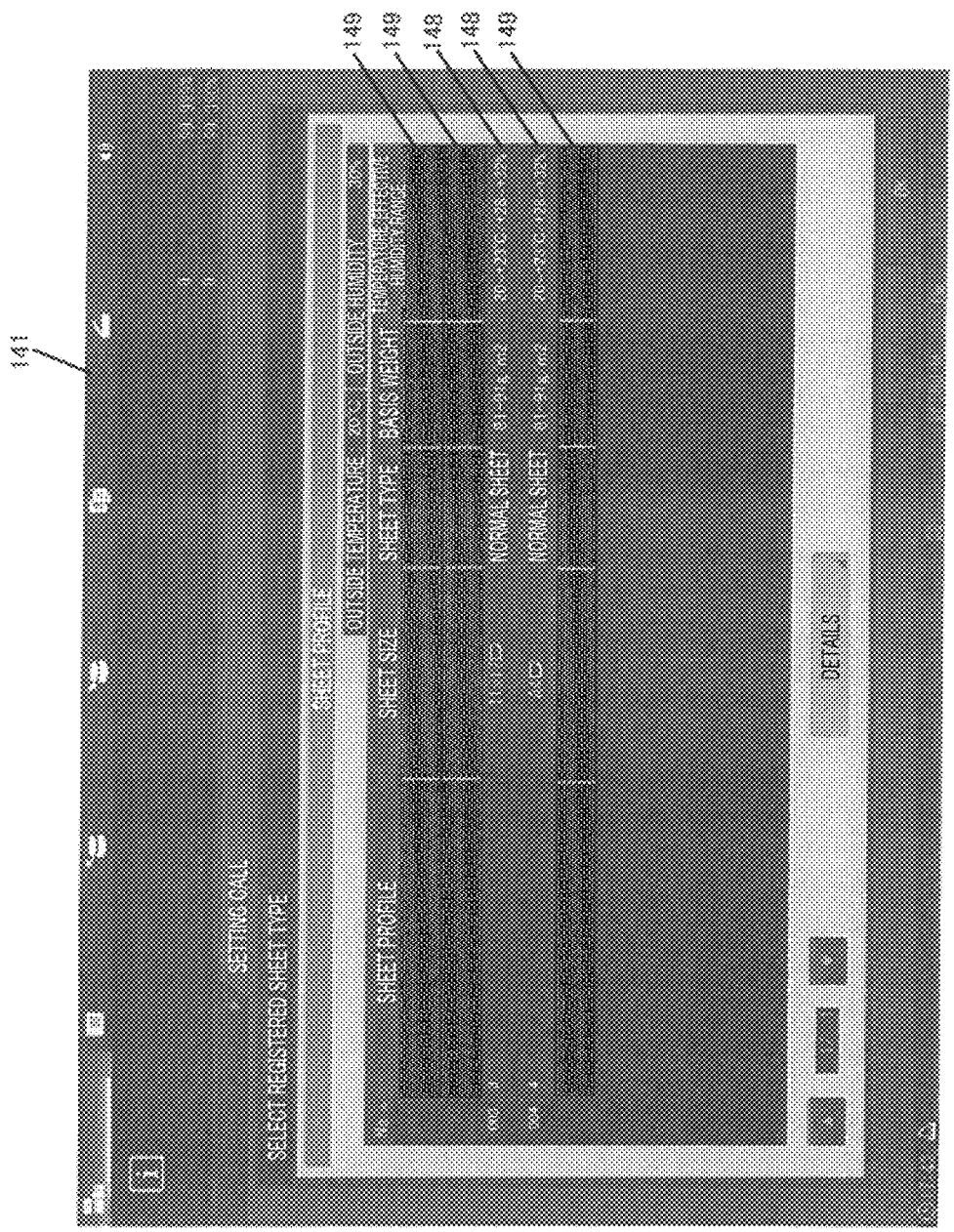
FIG. 5 illustrates a filtering display of a sheet profile.

Next, the way of indicating the retrieved sheet profile is described with reference to FIG. 5. FIG. 5 illustrates a filtering display of a sheet profile. As illustrated in FIG. 5, image control CPU 113 controls LCD 141 to indicate the retrieved sheet profile as filtering display 148. On the other hand, image control CPU 113 controls LCD 141 to indicate the sheet profile which is not subjected to retrieval as shaded display 149. While image control CPU 113 operates to indicate the retrieved sheet profile as filtering display 148, the present invention is not limited to this. For example, image control CPU 113 may control LCD 141 to indicate the retrieved sheet profile as a sort display.

Figure 6:
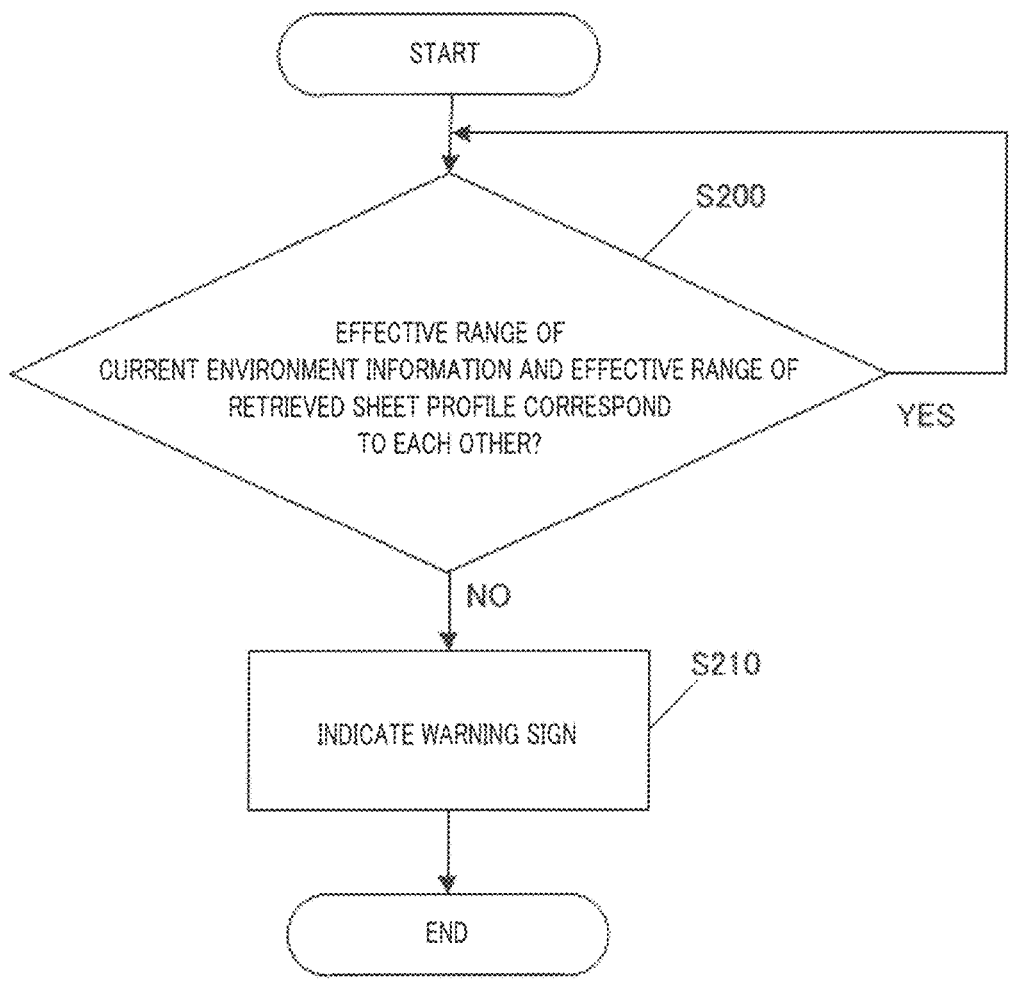
FIG. 6 is a flowchart of an inspection operation of a sheet profile.

Next, the determination whether the environment information of the sheet profile and the current environment information correspond to each other is described. FIG. 6 is a flowchart of an inspection operation of the sheet profile. The processing of this flowchart is started after the start of a job.

At step S200, image control CPU 113 determines whether the effective range of the current environment information (temperature and humidity) and the effective range of the retrieved sheet profile correspond to each other (determination on correspondence of the effective ranges). When image control CPU 113 determines that the effective ranges correspond to each other (step S200: YES), image control CPU 113 again determines whether the effective ranges correspond to each other (step S200). When image control CPU 113 does not determine that the effective ranges correspond to each other (step S200: NO), the process is advanced to step 210.

Figure 7:
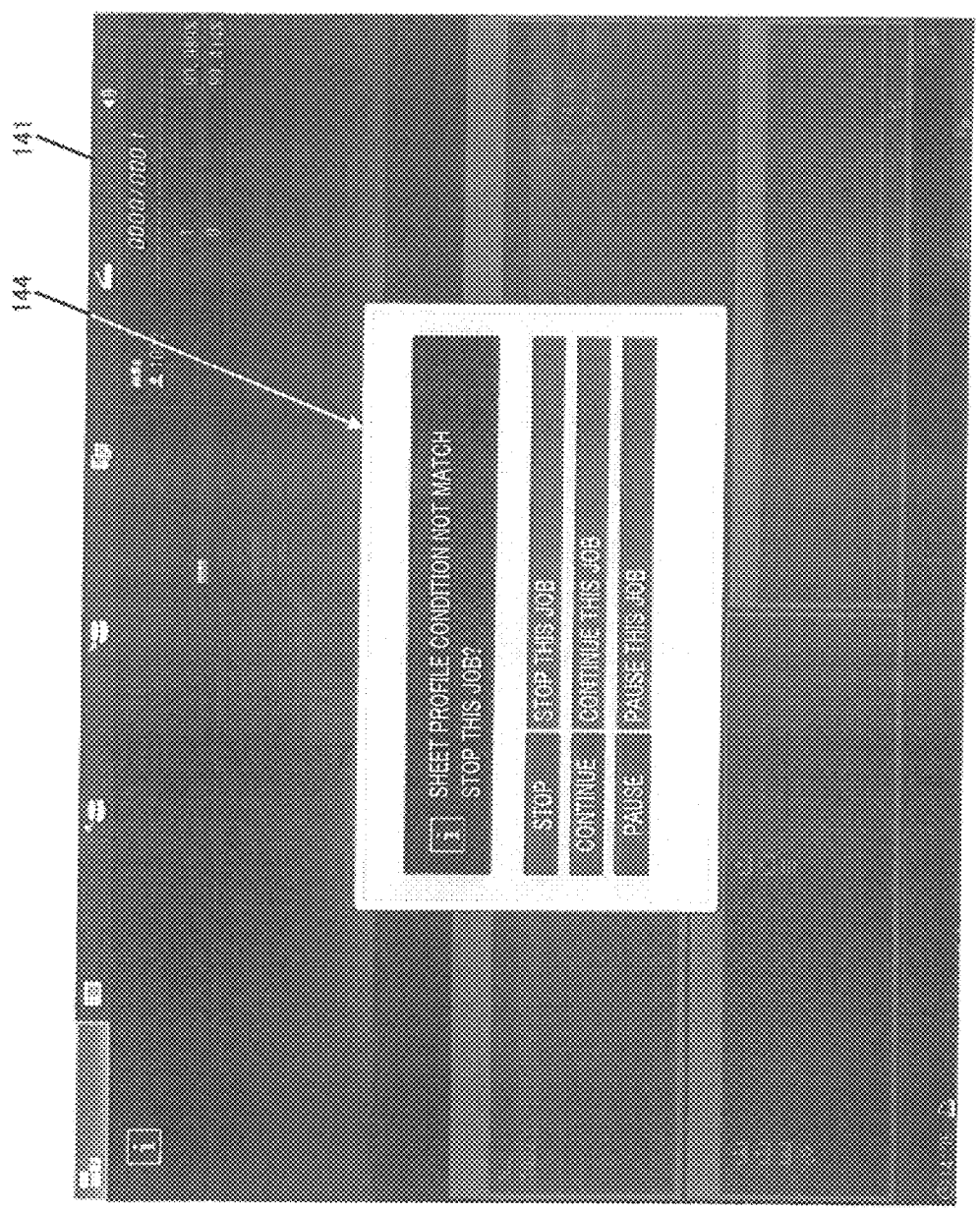
FIG. 7 illustrates a screen of a pop-up display.
Figure 8:
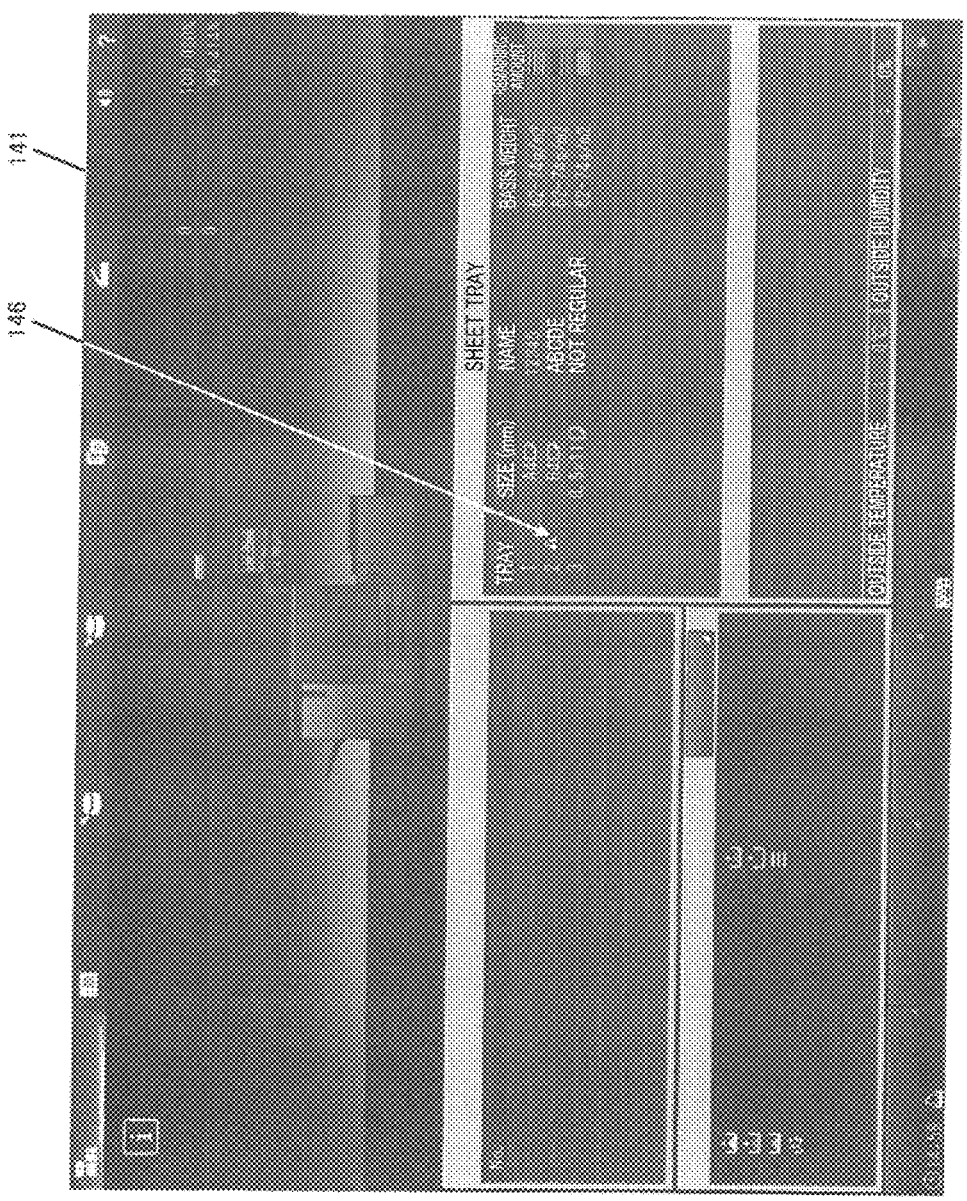
FIG. 8 illustrates a screen of an icon display.

At step S210, image control CPU 113 operates to indicate, as a warning sign, a pop-up display, an icon display, a display of sheet profile name whose letter color is changed, or a blink display of the sheet profile name on LCD 141, for example. FIG. 7 illustrates a screen of LCD 141 on which pop-up display 144 is indicated. FIG. 8 illustrates a screen of LCD 141 on which icon display 146 is indicated. When indicating pop-up display 144 illustrated in FIG. 7, image control CPU 113 operates to indicate a "change" button representing "change." In addition, when indicating icon display 146, image control CPU 113 operates to indicate an icon in a portion where the sheet profile name is indicated (machine status screen or the like). Alternatively, when image control CPU 113 determines that the "change" button is pressed down, the processing may be advanced to step S330 shown in FIG. 9 (described later).

Modification 1

In the above-mentioned embodiment, when image control CPU 113 determines that the environment information and the like do not correspond to each other and the like, a warning sign is indicated on display LCD 141 for the purpose of warning the user. In contrast, in Modification 1, after indication of a warning sign, image control CPU 113 receives an input on operation section 140, and retrieves the sheet profile for the purpose of continuing the job.

Next, an operation of retrieving the sheet profile after indication of a warning sign is described with reference to FIG. 9. The processing of this flowchart is started after indication of a warning sign. It is to be noted that steps S300, S320, and S340 of this flowchart are identical to steps S100, S110 of S130 of the flowchart of FIG. 4, and therefore the description thereof will be omitted.

At step S300, when the call button is pressed down (step S300: YES), the process is advanced to step S310.

At step S310, image control CPU 113 determines whether a warning sign is indicated on LCD 141. When it is determined that a warning sign is indicated (step S310: YES), the process is advanced to step 320. When it is determined that a warning sign is not indicated (step S310: NO), the process is advanced to step S350.

At step 320, image control CPU 113 acquires the current environment information (temperature and humidity), and then the process is advanced to step S320.

At step S330, image control CPU 113 retrieves, from among the registered sheet profiles, the sheet profile which is associated with the effective range of the current environment information, and has the sheet and the basis weight identical to the sheet and the basis weight which are in use until a current state is established. Here, the reason for retrieving the sheet profile having the sheet and the basis weight is that, typically, the sheet and the basis weight which are in use until a current state is established are also used after indication of a warning sign. Accordingly, when the call button is pressed down during indication of a warning sign, the sheet and the basis weight are subjected to the retrieval.

At step S340, image control CPU 113 controls LCD 141 to indicate the retrieved sheet profile. Image control CPU 113 performs an image formation control based on the image formation condition of the retrieved sheet profile. That is, even after a warning sign is indicated, the job can be continued with the sheet profile corresponding to the current environment information and the like, with a simple operation of pressing down of the call button by the user.

Next, an operation of retrieving the sheet profile in the case where a warning sign is not indicated is described with reference to FIG. 9.

Figure 9:
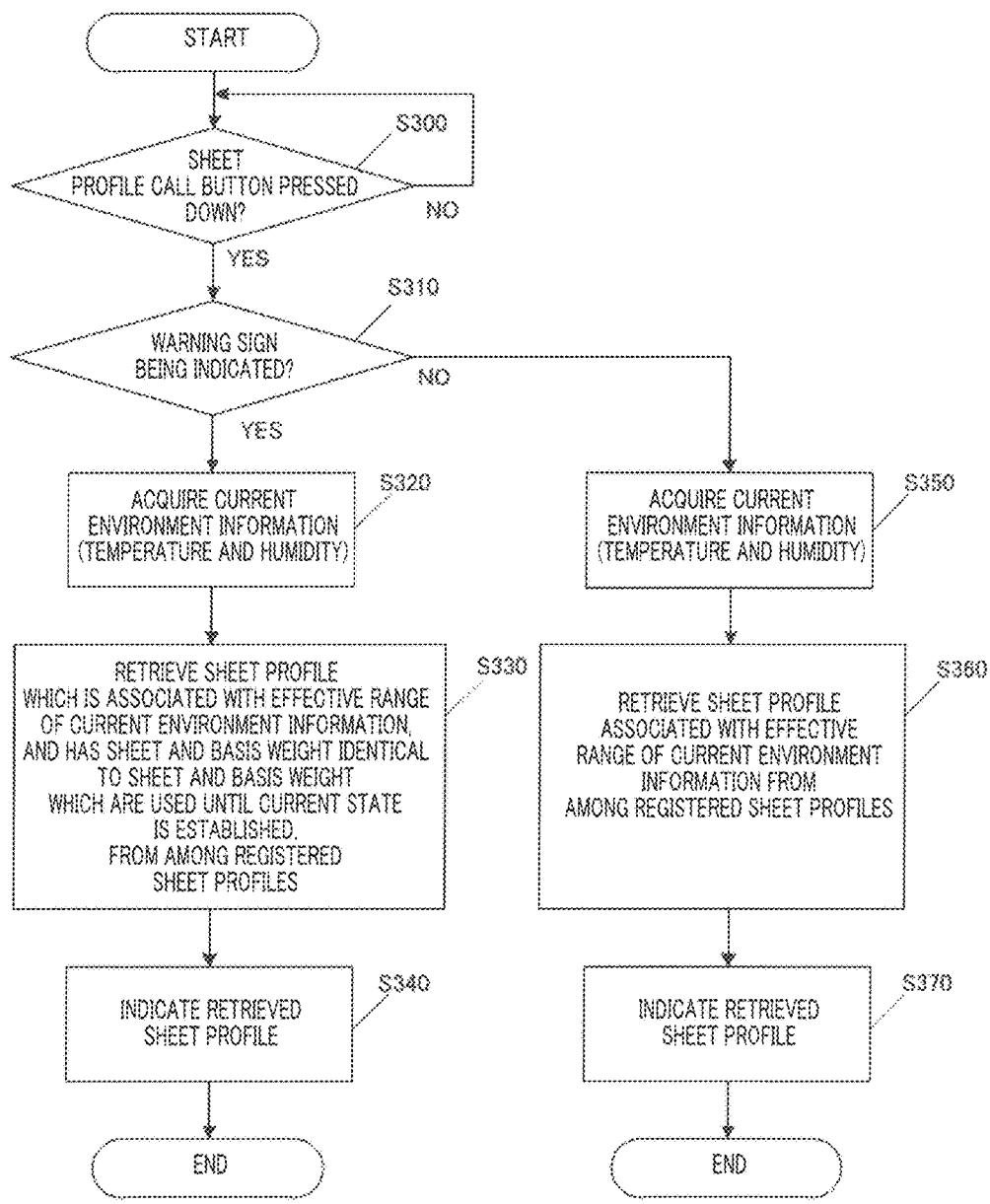
FIG. 9 is a flowchart of an operation of retrieving a sheet profile in the case where a warning sign is indicated and not indicated.

As illustrated in FIG. 9, step S350 to step S370, which are a sheet profile retrieving process in the case where a warning sign is not indicated, are identical to step S110 to step S130 illustrated in FIG. 4, and therefore the description thereof will be omitted.

Modification 2

In the above-mentioned embodiment and Modification 1, the effective range of the environment information and the sheet profile are associated with each other and stored in nonvolatile memory 115, that is, the environment information and the sheet profile are indirectly coordinated with each other and are stored in nonvolatile memory 115, and thus, indication of a warning sign during a job, and retrieval of the sheet profile during a job or after indication of a warning sign are performed based on the effective range.

In contrast, Modification 2, the environment information and the sheet profile are directly coordinated with each other and stored in nonvolatile memory 115 to perform indication of a warning sign during a job, and, retrieval of the sheet profile during a job or after indication of a warning sign based on the environment information.

A detailed configuration is described below. Image control CPU 113 performs storing in direct coordination with the acquired current environment information in nonvolatile memory 115. In this manner, the sheet profile is automatically registered, and thus registration can be prevented from being complicated.

In addition, image control CPU 113 retrieves, from among the sheet profiles stored in nonvolatile memory 115, the sheet profile corresponding to the acquired current environment information. In this manner, the sheet profile is automatically retrieved, and the task of selecting the sheet profile can be reduced.

Further, image control CPU 113 determines whether the acquired current environment information and the registered environment information of the sheet profile correspond to each other during a job, and when it is determined that the environment information do not correspond to each other, image control CPU 113 operates to indicate a warning sign.

Further, image control CPU 113 retrieves, from among the sheet profiles stored in nonvolatile memory 115, the sheet profile which is directly coordinated with the acquired current environment information, and has the sheet and the basis weight identical to the sheet and the basis weight which are in use until a current state is established during a job, or after indication of a warning sign. In this manner, the image formation is performed based on the image formation condition of the sheet profile in accordance with the current environment information, and thus reduction of the density and the quality of the output image can be prevented.

Next, another configuration of control block 110 is briefly described with reference to FIG. 2.

Image control CPU 113 is connected with RTC (date and time data generation device) 114 that clocks date and time with a driving source such as an inner battery and an outer battery.

Scanner section 130 includes CCD 131 configured to perform optical retrieval, and scanner control section 132 configured to control the entirety of scanner section 130. Scanner control section 132 is serial-communicatively connected with image control CPU 113, and scanner control section 132 is controlled by image control CPU 113. It is to be noted that scanner control section 132 may be composed of a CPU, a program for operating the CPU and the like. The image data read by CCD 131 is sent from scanner control section 132 to image control CPU 113, and sent to reading processing section 116 via DRAM control IC 111. The image data is processed in reading processing section 116. In addition, DRAM control IC 111 is connected with compression decompression IC 118 configured to compress or decompress the image data read by CCD 131.

In addition, DRAM control IC 111 is connected with image memory 122 composed of compression memory 120 and page memory 121. In image memory 122, the image data acquired by scanner section 130 and the image data acquired through LAN 50 are stored. As described above, image memory 122 is a storage region of image data, and stores image data of a job for printing. In addition, with DRAM control IC 111, image data relating to a plurality of jobs can be stored in image memory 122. That is, the image data of a reserved job can be stored in image memory 122. Further, PCI bus 112 connected with DRAM control IC 111 is connected with HDD 124 that stores image data through controller IC 123, and data in image memory 122 and the like are stored in HDD 124 as necessary.

Further, DRAM control IC 111 is connected with writing processing section 126. Through DRAM control IC 111 and image control CPU 113, writing processing section 126 is connected with configured to control printer control section 151 the entirety of printer section 150, and writing processing section 126 processes the data used for operation of LD 152 of printer section 150. Printer section 150 includes the above-mentioned image forming section 10, sheet feeding section 20 and the like.

Image control CPU 113 acquires environment information (temperature and humidity) at the start of execution of a job and after indication of a warning sign by temperature sensor 181 and humidity sensor 182, and retrieves the sheet profile associated with the effective range of the acquired environment information from among the registered sheet profiles. Image control CPU 113 controls the operation of image forming section 10 and the like based on the image formation condition of the retrieved sheet profile.

In addition, PCI bus 112 connected with DRAM control IC 111 is connected with DRAM control IC 161 of the above-mentioned image processing section (print and scanner controller). In image processing section (print and scanner controller) 160, DRAM control IC 161 is connected with image memory 162. In addition, in the image processing section (print and scanner controller), DRAM control IC 161 is connected with controller control section 163, and further DRAM control IC 161 is connected with LAN interface 165 through LAN control section 164. LAN interface 165 is connected with LAN 50. It is to be noted that LAN 50 is communicatively connected with terminal equipment 2 as described above.

According to image forming system 1 of the embodiment, image control CPU 113 retrieves the sheet profile associated with the effective range of the current environment information from among the registered sheet profiles. In this manner, the task of selecting the sheet profile can be reduced.

In addition, image control CPU 113 operates to indicate a sort display or a filtering display of the retrieved sheet profile. In this manner, the user can readily select the sheet profile.

In addition, when it is determined that the effective range of the retrieved sheet profile and the effective range of the current environment information do not correspond to each other, image control CPU 113 controls LCD 141 to indicate a warning sign. In this manner, the user can surely recognize the fact that the sheet profile does not correspond to the environment.

In addition, image control CPU 113 operates to indicate, as a warning signs, pop-up display 144, icon display 146, a display of sheet profile name whose letter color is changed, or a blink display of the sheet profile name. In this manner, the user can surely recognize the fact that the sheet profile does not correspond to the environment.

In addition, when it is determined that the effective range of the registered sheet profile and the effective range of the current environment information are different from each other, image control CPU 113 stores the effective range of the current environment information in association with the sheet profile in nonvolatile memory 115. In this manner, the capacity of nonvolatile memory 115 can be reduced in comparison with the case where the environment information and the sheet profile are stored in association with each other in nonvolatile memory 115 every time when the environment information of the registered sheet profile and the current environment information differ from each other.

While the acquisition section, the retrieval section, the control section and the storage section are provided in control block 110 of image forming apparatus 100 in the above-mentioned embodiment, the present invention is not limited to this. For example, the acquisition section, the retrieval section, the control section and the storage section may be provided in an information processing device such as terminal equipment 2 in image forming system 1 and the like.

In addition, while both temperature and humidity are used as environment information to be coordinated with the sheet profile in the above-mentioned embodiment, the present invention is not limited to this. For example, one of temperature and humidity may be used.

In addition, while image control CPU 113 operates to indicate pop-up display 144 or icon display 146 on LCD 141 as a warning sign for warning the user during a job when the effective range of the retrieved sheet profile and the effective range of the current environment information do not correspond to each other in the above-mentioned embodiment, the present invention is not limited to this. For example, image control CPU 113 may operate to indicate a display in which the letter color is changed, or a display in which the letters are blinked on LCD 141 as the warning sign.

The present invention is applicable to an image forming system composed of a plurality of units including an image forming apparatus. The units include, for example, a post-processing apparatus, an external storage apparatus such as a control apparatus connected with a network, and the like.

The embodiments disclosed herein are merely exemplifications and should not be considered as limitative. While the invention made by the present inventor has been specifically described based on the preferred embodiments, it is not intended to limit the present invention to the above-mentioned preferred embodiments but the present invention may be further modified within the scope and spirit of the invention defined by the appended claims.

REFERENCE SIGNS LIST

1 Image forming system
100 Image forming apparatus
113 Image control CPU
115 Nonvolatile memory
141 LCD

What is claimed is:

1. An image forming apparatus comprising:
a display;
a memory configured to store a plurality of sheet profiles which are each in coordination with environment information of at least one of a temperature and a humidity around the image forming apparatus, each of the plurality of sheet profiles including an image formation condition in accordance with a sheet;
the memory being configured to store a plurality of effective ranges of the environment information in association with the plurality of sheet profiles, each of the effective ranges of the environment information being at least one of a temperature range and a humidity range;
a sensor configured to detect the environment information including at least one of the temperature and the humidity around the image forming apparatus; and
a hardware processor configured to:
acquire the environment information detected by the sensor as current environment information;
retrieve one sheet profile from among the plurality of sheet profiles stored in the memory, the one sheet profile corresponding to one effective range of the plurality of effective ranges and being retrieved based on the current environment information, and
control operation of the image forming apparatus in accordance with the image formation condition on the retrieved sheet profile,
wherein the hardware processor is further configured to:
cause the display to display a warning sign when it is determined that the effective range of the retrieved sheet profile and the effective range of the current environment information do not correspond to each other when a print job is being printed, and
after the warning sign is displayed, the hardware processor is configured to detect an input by a user about whether to: i) use the retrieved sheet profile that does not correspond to the effective range of the current environment information or ii) retrieve a new sheet profile from the memory based on the current environment information, the hardware processor controlling operation of the image forming apparatus in accordance with the input by the user.

2. The image forming apparatus according to claim 1, wherein the hardware processor is further configured to indicate a sort display of the retrieved sheet profile.

3. The image forming apparatus according to claim 1, wherein the hardware processor is further configured to indicate a filtering display of the retrieved sheet profile.

4. The image forming apparatus according to claim 1, wherein, when it is determined that the effective range of the current environment information and the effective range of the sheet profile correspond to each other, the hardware processor does not indicate a warning sign even in a case where the acquired current environment information is changed.

5. The image forming apparatus according to claim 1, wherein the hardware processor operates to indicate a pop-up display as the warning sign.

6. The image forming apparatus according to claim 1, wherein the hardware processor operates to indicate an icon display as the warning sign.

7. The image forming apparatus according to claim 1, wherein the hardware processor operates to indicate a display of a sheet profile name whose letter color is changed as the warning sign.

8. The image forming apparatus according to claim 1, wherein the hardware processor operates to indicate a blink display of a sheet profile name as the warning sign.

9. The image forming apparatus according to claim 1, wherein, when the warning sign is indicated, the hardware processor retrieves a sheet profile which is coordinated with the current environment information and has a pair of a sheet and a basis weight identical to one of pairs of a sheet and a basis weight which are in use until a current state is established.

10. The image forming apparatus according to claim 1, wherein, when the warning sign is indicated, the hardware processor retrieves a sheet profile which is associated with an effective range of the current environment information and has a pair of a sheet and a basis weight identical to one of pairs of a sheet and a basis weight which are in use until a current state is established.

11. The image forming apparatus according to claim 1, wherein the hardware processor is further configured to acquire the current environment information and store a sheet profile corresponding to the acquired current environment information in the memory.

12. The image forming apparatus according to claim 11, wherein the hardware processor stores the effective range of the acquired current environment information in association with the sheet profile in the memory.

13. An image forming system composed of a plurality of units including an image forming apparatus, the image forming system comprising:
a display;
a memory configured to store a plurality of sheet profiles which are each in coordination with environment information of at least one of a temperature and a humidity around the image forming apparatus, each of the plurality of sheet profiles including an image formation condition in accordance with a sheet;
the memory being configured to store a plurality of effective ranges of the environment information in association with the plurality of sheet profiles, each of the effective ranges of the environment information being at least one of a temperature range and a humidity range;

a sensor configured to detect the environment information including at least one of the temperature and the humidity around the image forming apparatus; and a hardware processor configured to:
acquire the environment information detected by the sensor as current environment information;
retrieve one sheet profile from among the plurality of sheet profiles stored in the memory, the one sheet profile corresponding to one effective range of the plurality of effective ranges and being retrieved based on the current environment information, and
control operation of the image forming apparatus in accordance with the image formation condition on the retrieved sheet profile, wherein the hardware processor is further configured to:
cause the display to display a warning sign when it is determined that the effective range of the retrieved sheet profile and the effective range of the current environment information do not correspond to each other when a print job is being printed, and
after the warning sign is displayed, the hardware processor is configured to detect an input by a user about whether to: i) use the retrieved sheet profile that does not correspond to the effective range of the current environment information or ii) retrieve a new sheet profile from the memory based on the current environment information, the hardware processor controlling operation of the image forming apparatus in accordance with the input by the user.

14. A method for retrieving a sheet profile comprising:
storing a plurality of sheet profiles which are each in coordination with environment information of at least one of a temperature and a humidity around an image forming apparatus in a memory, each of the plurality of sheet profiles including an image formation condition in accordance with a sheet;

the memory being configured to store a plurality of effective ranges of the environment information in association with the plurality of sheet profiles, each of the effective ranges of the environment information being at least one of a temperature range and a humidity range;

detecting the environment information including at least one of the temperature and the humidity around the image forming apparatus using a sensor;

acquiring the environment information detected by the sensor;

retrieving one sheet profile from among the plurality of sheet profiles stored in the memory, the one sheet profile corresponding to one effective range of the plurality of effective ranges and being retrieved based on the acquired current environment information from the stored sheet profile;

controlling operation of the image forming apparatus in accordance with the image forming condition on the received sheet profile;

causing a display of the image forming apparatus to display a warning sign when it is determined that the effective range of the retrieved sheet profile and the effective range of the current environment information do not correspond to each other when a print job is being printed, and after the warning sign is displayed, detecting an input by a user about whether to: i) use the retrieved sheet profile that does not correspond to the effective range of the current environment information or ii) retrieve a new sheet profile from the memory based on the current environment information, the method comprising controlling operation of the image forming apparatus in accordance with the input by the user.

* * * * *